US009700146B1

(12) United States Patent
Emerson

(10) Patent No.: US 9,700,146 B1
(45) Date of Patent: Jul. 11, 2017

(54) COLLAPSIBLE VIDEO DISPLAY SUPPORT SYSTEM

(71) Applicant: Neale Emerson, Venice, FL (US)

(72) Inventor: Neale Emerson, Venice, FL (US)

( * ) Notice: Subject to any disclaimer, the term of this patent is extended or adjusted under 35 U.S.C. 154(b) by 62 days.

(21) Appl. No.: 14/962,061

(22) Filed: Dec. 8, 2015

(51) Int. Cl.
A47C 7/72 (2006.01)
H04R 1/02 (2006.01)
F16M 11/26 (2006.01)

(52) U.S. Cl.
CPC ............ A47C 7/72 (2013.01); F16M 11/26 (2013.01); H04R 1/028 (2013.01); H04R 2400/03 (2013.01)

(58) Field of Classification Search
None
See application file for complete search history.

(56) References Cited

U.S. PATENT DOCUMENTS

| 4,779,922 | A | * | 10/1988 | Cooper | A47B 21/03 248/918 |
| 4,915,450 | A | * | 4/1990 | Cooper | F16M 11/10 248/919 |
| 5,158,074 | A | * | 10/1992 | Grellas | A61H 1/0274 297/188.21 |
| 5,177,616 | A | * | 1/1993 | Riday | B64D 11/0015 248/917 |
| 5,374,104 | A | * | 12/1994 | Moore | A47C 7/72 248/286.1 |
| 6,270,157 | B1 | * | 8/2001 | Kapushinski | A47B 83/02 297/170 |
| 6,315,358 | B1 | * | 11/2001 | Baru | A47B 21/00 297/170 |
| D465,343 | S | * | 11/2002 | Daneault | D6/338 |
| 6,712,008 | B1 | * | 3/2004 | Habenicht | A47B 21/0314 108/147 |
| 6,796,536 | B1 | * | 9/2004 | Sevier, IV | A47B 23/046 248/121 |
| 7,134,719 | B2 | | 11/2006 | Moglin et al. | |
| 7,347,492 | B2 | * | 3/2008 | DiRe | A61C 19/00 297/217.3 |
| D598,207 | S | * | 8/2009 | Smit | D6/335 |
| 7,568,760 | B1 | | 8/2009 | Lodes | |
| 7,823,973 | B2 | | 11/2010 | Dragusin | |

(Continued)

FOREIGN PATENT DOCUMENTS

WO WO9904670 A1 2/1999

Primary Examiner — Kyle Walraed-Sullivan

(57) ABSTRACT

The collapsible video display support system is an audio visual display support with an elongated base that is integrated with a modified chair. The collapsible video display support system is customized to provide an audio visual experience to the occupant of the modified chair. The modified chair further comprises a plurality of tactile transducers. The plurality of tactile transducers are integrated into the sound component of the audio visual component. Specifically, the tactile transducers take a subset of audio frequencies from between 16 Hz and 524 Hz and converts those frequencies into a vibration that can be felt by the user of the chair. The collapsible video display support system can be collapsed for ease of transport and storage. The collapsible video display support system comprises a base structure, a stanchion, a video display mount, a chair, and a plurality of tactile transducers.

12 Claims, 5 Drawing Sheets

(56) References Cited

U.S. PATENT DOCUMENTS

| | | | | |
|---|---|---|---|---|
| 7,922,249 B2* | 4/2011 | Marchand | | A47B 83/02 297/145 |
| 8,726,814 B1* | 5/2014 | Matteo | | A47B 9/16 108/116 |
| 2004/0163574 A1* | 8/2004 | Schoenbach | | A47B 23/046 108/50.01 |
| 2004/0172887 A1* | 9/2004 | Moglin | | A47C 7/72 52/36.1 |
| 2004/0254020 A1* | 12/2004 | Dragusin | | A47C 7/72 463/46 |
| 2005/0127724 A1* | 6/2005 | Irwin | | A61G 15/16 297/188.01 |
| 2006/0158836 A1 | 7/2006 | Phillips | | |
| 2007/0035164 A1* | 2/2007 | North | | A47C 1/0242 297/217.1 |
| 2008/0164737 A1* | 7/2008 | Fowlds | | A47C 1/035 297/284.4 |
| 2009/0154737 A1* | 6/2009 | Ostler | | A47C 7/72 381/301 |
| 2010/0001563 A1* | 1/2010 | Baru | | A47B 21/00 297/217.1 |
| 2010/0194155 A1* | 8/2010 | Dankovich | | A47B 83/001 297/188.21 |
| 2010/0201165 A1* | 8/2010 | Dankovich | | A47B 83/001 297/135 |
| 2011/0031788 A1* | 2/2011 | Kosik | | A47C 3/0257 297/217.3 |
| 2011/0084528 A1* | 4/2011 | Gierse | | A61G 5/14 297/313 |
| 2011/0193372 A1* | 8/2011 | Pizzuto | | A47C 1/143 297/16.1 |
| 2012/0146368 A1* | 6/2012 | Oltesvig | | A47C 7/72 297/188.04 |
| 2013/0248669 A1* | 9/2013 | Liu | | F16M 11/105 248/226.11 |
| 2014/0084642 A1* | 3/2014 | Park | | A47C 7/72 297/180.12 |
| 2014/0265460 A1* | 9/2014 | Voigt | | A47B 83/02 297/61 |
| 2014/0306075 A1* | 10/2014 | Stieler | | A47C 7/68 248/176.3 |
| 2015/0123431 A1* | 5/2015 | Ergun | | A47B 83/02 297/173 |
| 2016/0157618 A1* | 6/2016 | Arnett | | A47C 9/002 297/174 R |
| 2016/0338495 A1* | 11/2016 | Purintun | | A47C 7/72 |

* cited by examiner

COLLAPSIBLE VIDEO DISPLAY SUPPORT SYSTEM

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of video display supports, more specifically, a video stand adapted for use with a chair.

SUMMARY OF INVENTION

The collapsible video display support system is an audio visual display support with an elongated base that is integrated with a modified chair. The collapsible video display is adapted for use with an audio visual entertainment system. The collapsible video display support system is customized to provide an audio visual experience to the occupant of the modified chair. The modified chair further comprises a plurality of tactile transducers. The plurality of tactile transducers are integrated into the sound component of the audio visual component. Specifically, the tactile transducers take a subset of audio frequencies selected from between 12 Hz and 524 Hz and converts those frequencies into a vibration that can be felt by the user of the chair. The collapsible video display support system can be collapsed for ease of transport and storage.

These together with additional objects, features and advantages of the collapsible video display support system will be readily apparent to those of ordinary skill in the art upon reading the following detailed description of the presently preferred, but nonetheless illustrative, embodiments when taken in conjunction with the accompanying drawings.

In this respect, before explaining the current embodiments of the collapsible video display support system in detail, it is to be understood that the collapsible video display support system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the collapsible video display support system.

It is therefore important that the claims be regarded as including such equivalent construction insofar as they do not depart from the spirit and scope of the collapsible video display support system. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

Figure 1:
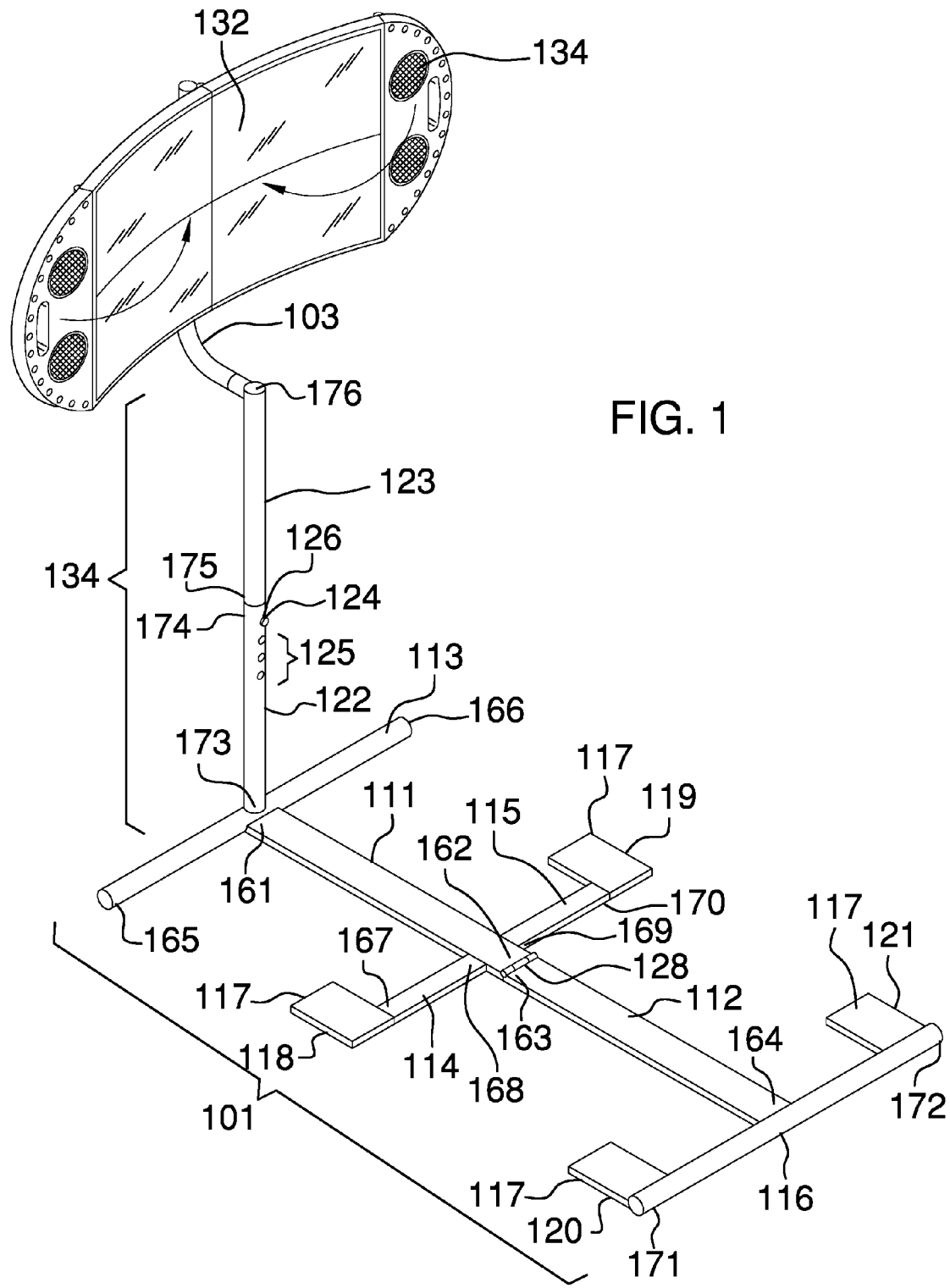
FIG. 1 is a perspective view of an embodiment of the disclosure.
Figure 2:
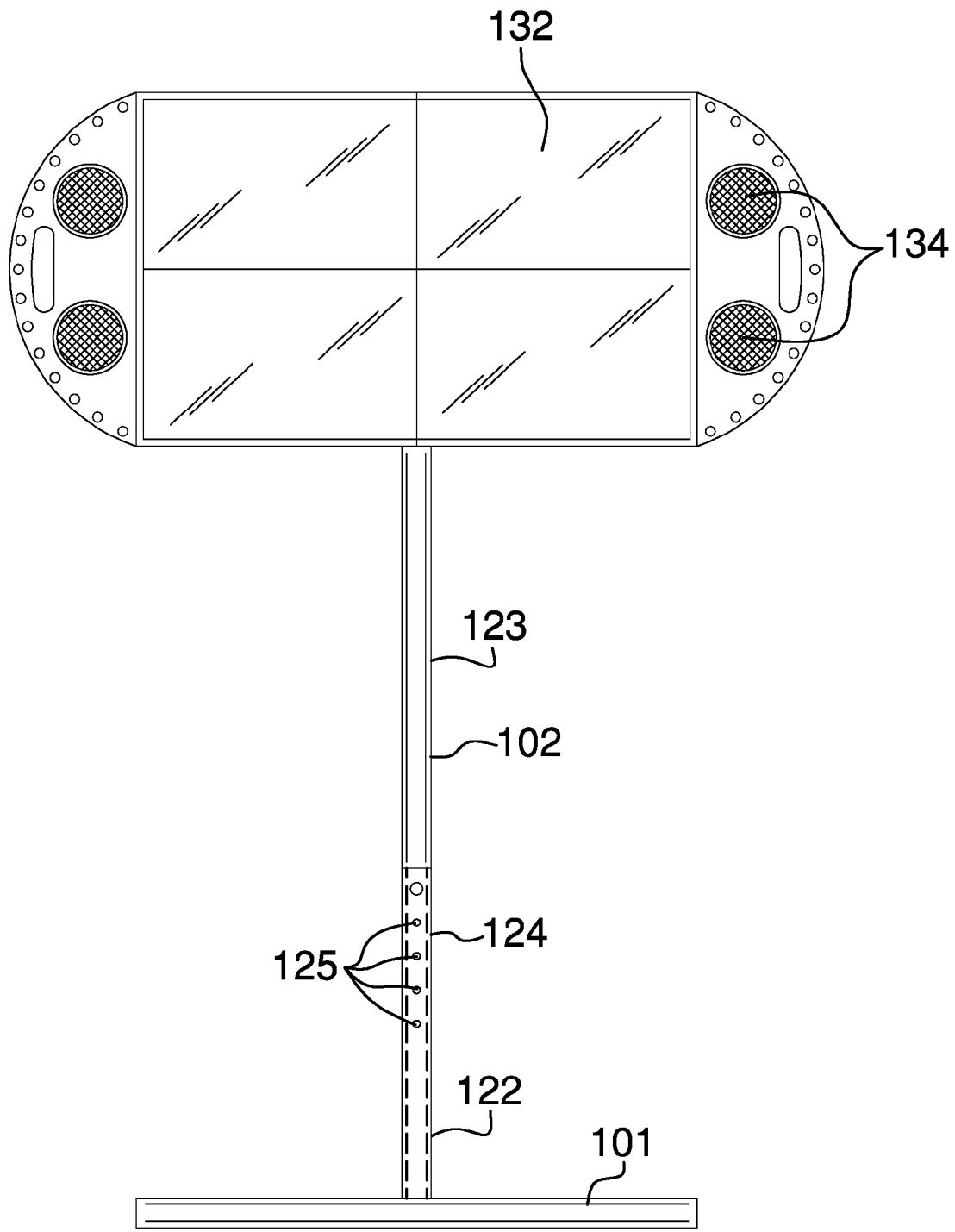
FIG. 2 is a front view of an embodiment of the disclosure.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to a first potential embodiment of the disclosure, which is illustrated in FIGS. 1 through 5. The collapsible video display support system 100 (hereinafter invention) comprises a base structure 101, a stanchion 102, a video display mount 103, a modified chair 104, and a plurality of tactile transducers 105.

The base structure 101 is placed on a supporting surface and provides the stability and support for the invention 100. The base structure 101 comprises a first base plate 111, a second base plate 112, a first cross bar 113, a second cross bar 114, a third cross bar 115, a fourth cross bar 116, a plurality of foot pads 117, and a hinge 128. The plurality of foot pads 117 further comprises a first foot pad 118, a second foot pad 119, a third foot pad 120 and a fourth foot pad 121. The first base plate 111 is a commercially available metal plate. The first base plate 111 is further defined with a first end 161 and a second end 162. The second base plate 112 is a commercially available metal plate. The second base plate 112 is further defined with a third end 163 and a fourth end 164. The first cross bar 113 is a commercially available metal strut. The first cross bar 113 is further defined with a fifth end 165 and a sixth end 166. The second cross bar 114 is a commercially available metal strut. The second cross bar 114 is further defined with a seventh end 167 and an eighth end 168. The third cross bar 115 is a commercially available metal strut. The third cross bar 115 is further defined with a ninth end 169 and a tenth end 170. The fourth cross bar 116 is a commercially available metal strut. The fourth cross bar 116 is further defined with an eleventh end 171 and a twelfth end 172. Each of the plurality of foot pads 117 is a commercially available metal plate. The hinge 128 is a commercially available hinge.

This paragraph describes the assembly of the base structure 101. This assembly is most clearly seen in FIG. 1. The second end 162 of the first base plate 111 is attached to the third end 163 of the second base plate 112 using the hinge 128. The first end 161 of the first base plate 111 is attached to the center of the first cross bar 113 such that the first cross bar 113 runs perpendicular to the first base plate 111. The eighth end 168 of the second cross bar 114 is attached to the first base plate 111 near the location of the hinge 128 such that the second cross bar 114 projects perpendicularly away from the first base plate 111 in a manner parallel to the first cross bar 113. The ninth end 169 of the third cross bar 115 is attached to the first base plate 111 near the location of the hinge 128 such that: 1) the third cross bar 115 projects perpendicularly away from the first base plate 111 in a manner parallel to the first cross bar 113, and, the attachment point of the eighth end of the second cross bar 114 to the first base plate 111 is directly opposite the attachment point of the ninth end 169 of the third cross bar 115 to the first base plate 111.

The fourth end 164 of the second base plate 112 is attached to the center of the fourth cross bar 116 such that the fourth cross bar 116 is perpendicular to the second base plate 112. The first foot pad 118 is attached to the seventh end 167 of the second cross bar 114. The second foot pad 119 is attached to the tenth end 170 of the third cross bar 115. The third foot pad 120 is attached to the eleventh end 171 of the fourth cross bar 116. The fourth foot pad 121 is attached to the twelfth end 172 of the fourth cross bar 116. In the first potential embodiment of this disclosure, all the attachments described in this paragraph were welded.

The positioning of the second cross bar 114, third cross bar 115, and the fourth cross bar 116 and the plurality of foot pads 117 is selected such that the legs 133 of the modified chair 104 will sit rest on the plurality of foot pads 117 when the modified chair 104 is positioned in front of the audio visual system 132.

The stanchion 102 is a post that is used to support the audio visual system 132 off the support surface for display to the modified chair 104. The stanchion 102 comprises a first post 122, a second post 123, and a height adjustment device 124. The first post 122 is a metal pipe that is further defined with a thirteenth end 173 and a fourteenth end 174. The thirteenth end of the first post 122 is attached to the center of the first cross bar 113 using commercially available hardware. The second post 123 is a metal pipe that is further defined with a fifteenth end 175 and a sixteenth end 176. The first post 122 and the second post 123 are arranged in telescopic arrangement. The outer diameter of the second post 123 is lesser than the inner diameter of the first post 122 thus allowing the second post 123 to be inserted into the first post 122. The relative position of the second post 123 to the first post 122 is maintained using the height adjustment device 124.

The height adjustment device 124 further comprises a plurality of holes 125 and a spring tab 126. The plurality of holes 125 are formed in a line that runs parallel to the center axis of the first post 122 at the fourteenth end 174 of the first post 122. The spring tab 126 is formed in the fifteenth end 175 of the second post 123. The spring tab 126 is a shaft that is spring loaded with a compressive spring that projects perpendicularly away from the center axis of the second post 123. To insert the fifteenth end 175 of the second post 123, the spring tab 126 is compressed into the second post 123. When the position of the second post 123 relative to the first post is at the desired position, the second post 123 is rotated until the spring tab 126 is pushed by the compressive spring through a hole selected from the plurality of holes 125. By changing the hole selected from the plurality of holes 125 the height of the stanchion 102, and by implication the height of the audio visual system 132 can be adjusted.

Figure 3:
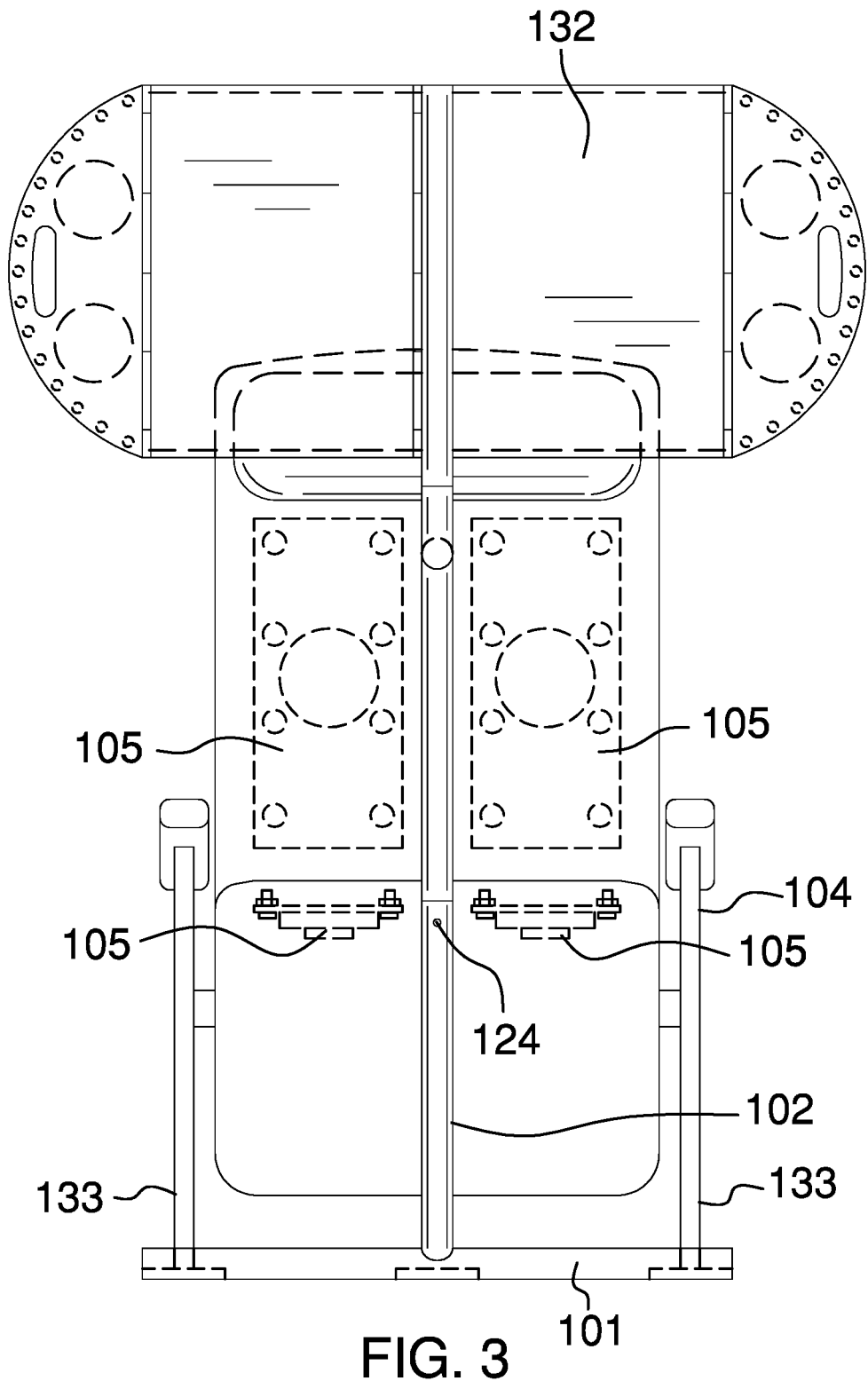
FIG. 3 is a rear view of an embodiment of the disclosure.
Figure 4:
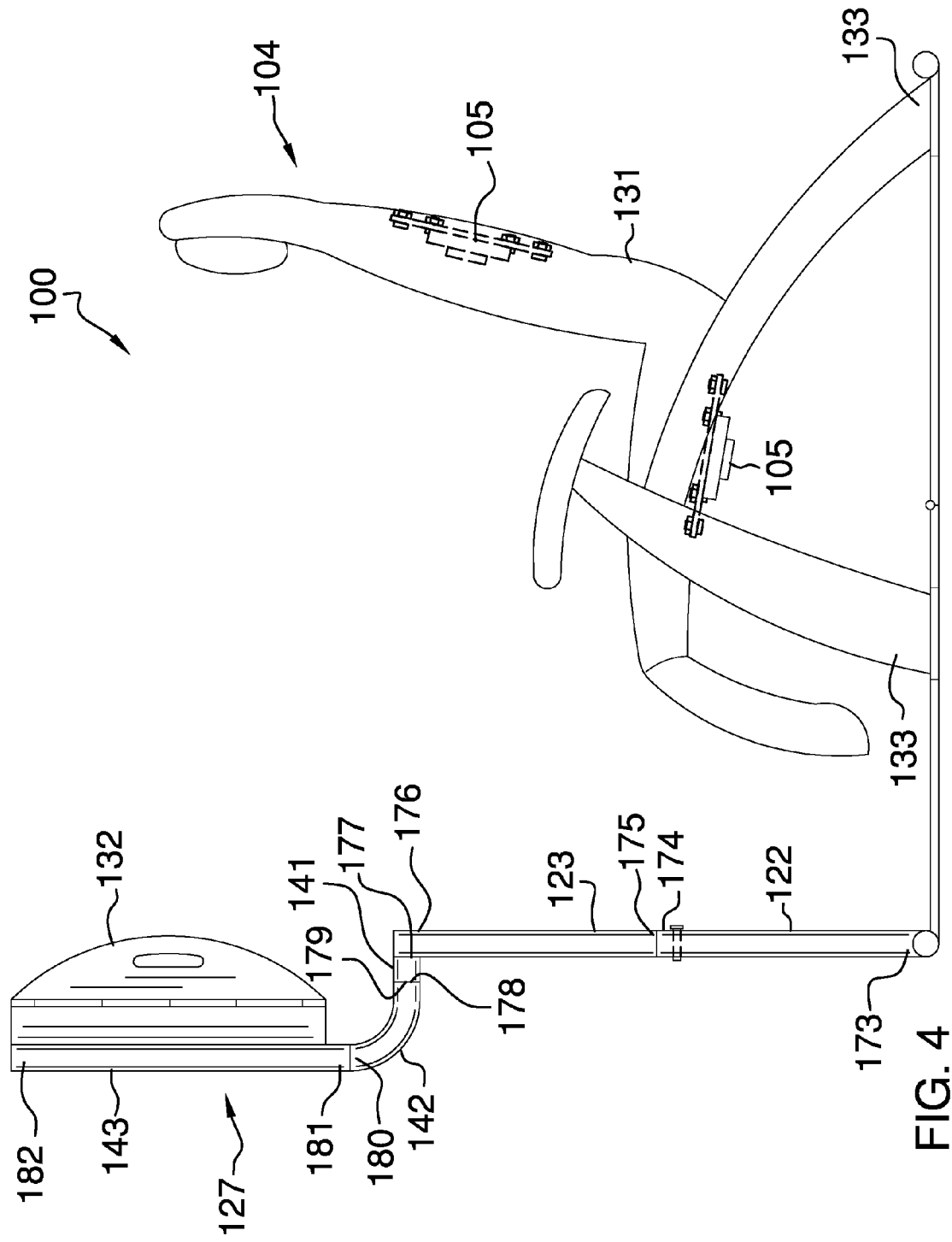
FIG. 4 is a side view of an embodiment of the disclosure.
Figure 5:
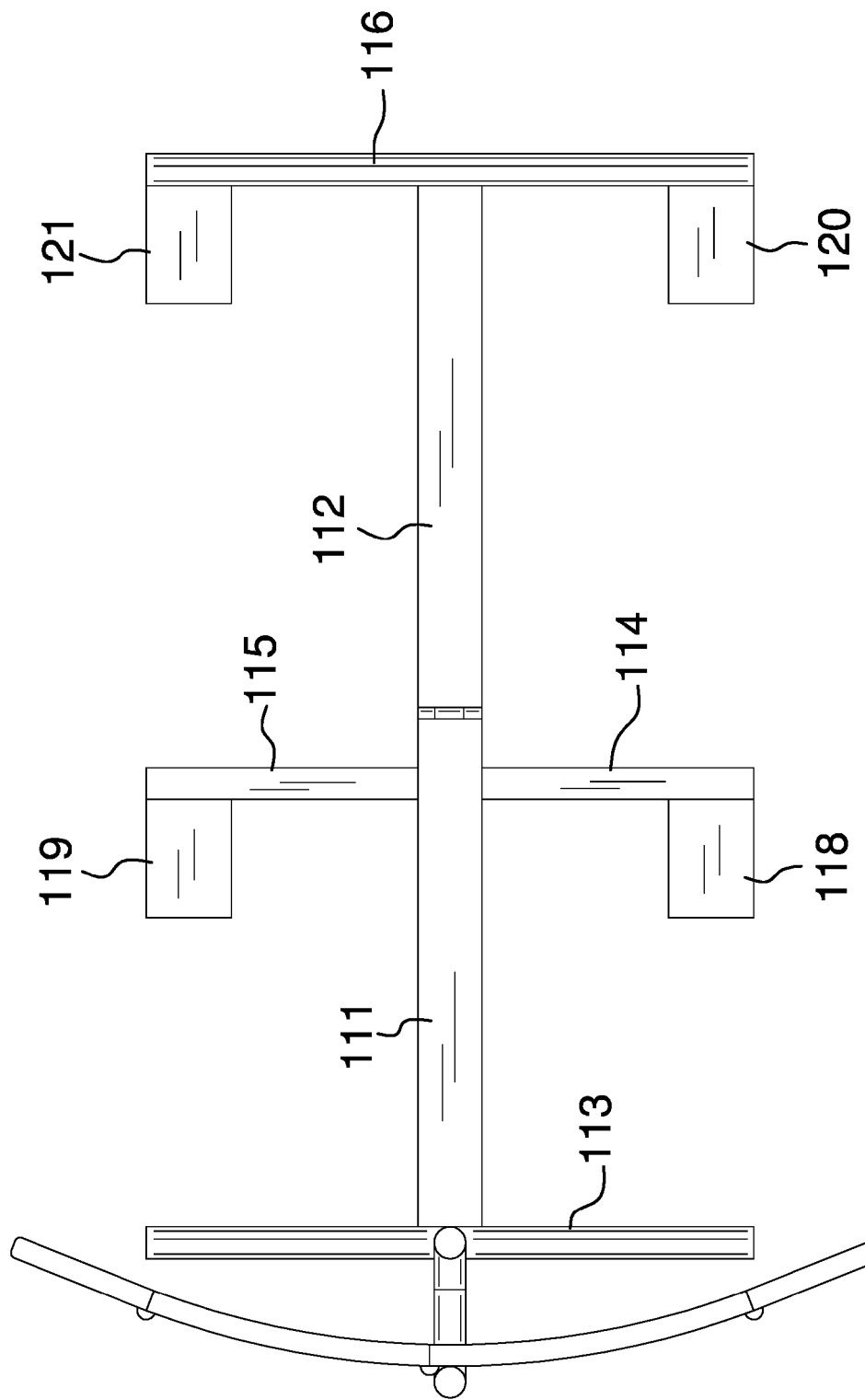
FIG. 5 is a top view of an embodiment of the disclosure.

The stanchion further comprises a curved post 127. The curved post 127 is the structure that supports the audio visual system 132 and the video display mount 103. The curved post 127 further comprises an extension 141, an elbow 142, and a support post 143. The extension 141 is a metal pipe that is further defined with a seventeenth end 177 and an eighteenth end 178. The elbow 142 is a 90 degree elbow metal pipe that is further defined with a nineteenth end 179 and a twentieth end 180. The support post 143 is a metal pipe that is further defined with a twenty first end 181 and a twenty second end 182. As shown in FIG. 3, the seventeenth end 177 of the extension 141 is attached to the sixteenth end 176 of the second post 123 such that the center axis of the extension 141 runs perpendicularly through the center axis of the second post 123. The nineteenth end 179 of the elbow 142 is attached to the eighteenth end 178 of the extension 141 such that the nineteenth end 179 of the elbow 142 is aligned with the eighteenth end 178 of the extension 141. The twenty first end 181 of the support post 143 is attached to the twentieth end 180 of the elbow 142 such that the support post 143 is aligned with the twentieth end 180 of the elbow 142.

The attachment methods used to make the attachments described in this paragraph include, but are not limited to, welding, the use of threaded connections, or the use of commercially available hardware. The benefit of using threaded connections is that the curved post 127 can be readily assembled and disassembled which supports the collapsible nature of the invention 100. The use of threaded connections is preferred.

The video display mount 103 is a readily and commercially available brackets that is used to mount audio visual systems 132 to a wall. Specifically, the video display mount 103 is mounted on the support post 143 using commercially available hardware. The audio visual 132 system is then secured to the video display mount 103 according to the instructions supplied with the video display mount 103.

The modified chain 104 is a chair 131 that is modified with a plurality of tactile transducers 105. Each of the plurality of tactile transducers 105 is a commercially available tactile transducer (also commonly known as a base shaker). Each of the tactile transducers is connected to the audio visual system 132 as one of the speakers 134 associated with the audio visual system 132. Once connected, each of the plurality of tactile transducers 105 converts the signal received from the audio visual system 132 into a vibration that is transmitted through the modified chair 104. The modified chair 104 is modified by mounting each of the plurality of tactile transducers 105 to the frame of the chair 131. Tactile transducers are readily and commercially available. Chairs 131 are readily and commercially available. A recliner type chair 131 is preferred for this application.

To use the invention 100, the invention 100 is assembled as described above. The modified chair 104 is placed in the base structure 101 such that each leg 133 of the modified chair 104 rests in the foot pad selected from the plurality of foot pads 117. The user then sits in the modified chair 104 and watches the audio visual system 132 normally.

To collapse the invention 100, the modified chair 104 and the audio visual system 132 is removed. The video display mount 103 is removed from the curved post 127 and disassembled. The curved post 127 is removed from the stanchion 102 and disassembled. The second post 123 is removed from the first post 122. The first post is removed from the first cross bar 113 and the second base plate 112 is folded on top of the first base plate 111 using the hinge 128 as the pivot point.

The following definitions were used in this disclosure:

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; or, 4) the point, pivot, or axis around which something revolves.

Center Axis: As used in this disclosure, the center axis is the axis of a cylinder like structure. When the center axes of two cylinder like structures share the same line they are said to be aligned. When the center axes of two cylinder like structures do not share the same line they are said to be offset.

Inner Diameter: As used in this disclosure, the term inner diameter is used in the same way that a plumber would refer to the inner diameter of a pipe.

Outer Diameter: As used in this disclosure, the term outer diameter is used in the same way that a plumber would refer to the outer diameter of a pipe.

Pipe: As used in this disclosure, the term pipe is used to describe a rigid hollow cylinder. While pipes that are suitable for use in this disclosure are often used to transport on convey fluids or gasses, the purpose of the pipes in this disclosure are structural. In this disclosure, the terms inner diameter of a pipe and outer diameter are used as they would be used by those skilled in the plumbing arts.

Speaker: As used in this disclosure, the term a speaker is an electrical device that converts an electrical signal into an audible sound.

Telescopic: As used in this disclosure, telescopic is an adjective that describes an object made of sections that fit or slide into each other such that the object can be made longer or shorter by adjusting the relative positions of the sections.

With respect to the above description, it is to be realized that the optimum dimensional relationship for the various components of the invention described above and in FIGS. 1 through 5, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A support comprising:
   a base structure, a stanchion, a video display mount, and a chair;
   wherein the support is adapted for use with an audio visual system;
   wherein the chair is placed within the base structure;
   wherein a position of the audio visual system is adjustable;
   wherein the chair further comprises a plurality of tactile transducers;
   wherein the support is collapsible;
   wherein the base structure comprises a first base plate, a second base plate, a first cross bar, a second cross bar, a third cross bar, a fourth cross bar, a plurality of foot pads, and a hinge;
   wherein the stanchion comprises a first post, a second post, and a height adjustment device;
   wherein the plurality of foot pads further comprises a first foot pad, a second foot pad, a third foot pad and a fourth foot pad;
   wherein the first base plate is a metal plate; wherein the first base plate is further defined with a first end and a second end;
   wherein the second base is a metal plate;
   wherein the second base is further defined with a third end and a fourth end; wherein the first cross bar is a metal strut;
   wherein the first cross bar is further defined with a fifth end and a sixth end; wherein the second cross bar is metal strut;
   wherein the second cross bar is further defined with a seventh end and an eighth end; wherein the third cross bar is a metal strut;
   wherein the third cross bar is further defined with a ninth end and a tenth end;
   wherein the fourth cross bar is a metal strut; wherein the fourth cross bar is further defined with an eleventh end and a twelfth end;
   wherein each of the plurality of foot pads is a metal plate;
   wherein the second end of the first base plate is attached to the third end of the second base plate using the hinge;
   wherein the first end of the first base plate is attached to a center of the first cross bar such that the first cross bar runs perpendicular to the first base plate;
   wherein the eighth end of the second cross bar is attached to the first base plate such that the second cross bar projects perpendicularly away from the first base plate in a manner parallel to the first cross bar;
   wherein the ninth end of the third cross bar is attached to the first base plate such that the third cross bar projects perpendicularly away from the first base plate in a manner parallel to the first cross bar;
   wherein the ninth end of the third cross bar is attached to the first base plate such that the attachment point of the eighth end of the second cross bar to the first base plate is directly opposite the attachment point of the ninth end of the third cross bar to the first base plate;
   wherein the fourth end of the second base plate is attached to the center of the fourth cross bar such that the fourth cross bar is perpendicular to the second base plate.

2. The support according to claim 1 wherein
   the first foot pad is attached to the seventh end of the second cross bar;
   wherein the second foot pad is attached to the tenth end of the third cross bar;
   wherein the third foot pad is attached to the eleventh end of the fourth cross bar;
   wherein the fourth foot pad is attached to the twelfth end of the fourth cross bar.

3. The support according to claim 2 wherein the positioning of the second cross bar, third cross bar, and the fourth cross, and the plurality of foot pads is selected such that legs of the chair will rest on the plurality of foot pads when the chair is positioned in front of the audio visual system.

4. The support according to claim 3 wherein
   the first post is a metal pipe that is further defined with a thirteenth end and a fourteenth end;

wherein the second post is a metal pipe that is further defined with a fifteenth end and a sixteenth end.

5. The support according to claim 4 wherein the first post and the second post are arranged in a telescopic manner.

6. The support according to claim 5 wherein the thirteenth end of the first post is attached to a center of the first cross bar.

7. The support according to claim 6 wherein the height adjustment device further comprises a plurality of holes and a spring tab;
   wherein the plurality of holes are formed in a line that runs parallel to a center axis of the first post adjacent to the fourteenth end of the first post;
   wherein the spring tab is formed adjacent to the fifteenth end of the second post.

8. The support according to claim 7 wherein
   the stanchion further comprises a curved post;
   wherein the curved post further comprises an extension, an elbow, and a support post.

9. The support according to claim 8 wherein the video display mount is mounted on the support post.

10. The support according to claim 9 wherein the each of the plurality of tactile transducers is connected to the audio visual system as one of a plurality of speakers associated with the audio visual system.

11. The support according to claim 10 wherein each of the plurality of tactile transducers is attached to a frame of said chair.

12. The support according to claim 11 wherein the chair is placed in the base structure such that each leg of the chair rests in a foot pad selected from the plurality of foot pads.

* * * * *